(12) United States Patent
Sano

(10) Patent No.: US 8,294,777 B2
(45) Date of Patent: Oct. 23, 2012

(54) CHROMATIC COORDINATE CONVERTING APPARATUS, IMAGING APPARATUS, COMPUTER READABLE RECORDING MEDIUM, AND CREATING METHOD OF CHROMATIC COORDINATE CONVERTING TABLE

(75) Inventor: Hisashi Sano, Tokyo (JP)

(73) Assignee: Nikon Corporation, Tokyo (JP)

( * ) Notice: Subject to any disclaimer, the term of this patent is extended or adjusted under 35 U.S.C. 154(b) by 893 days.

(21) Appl. No.: 12/216,772

(22) Filed: Jul. 10, 2008

(65) Prior Publication Data
US 2009/0021638 A1 Jan. 22, 2009

(30) Foreign Application Priority Data
Jul. 20, 2007 (JP) ................................. 2007-189710

(51) Int. Cl.
*H04N 5/228* (2006.01)
*H04N 9/73* (2006.01)
(52) U.S. Cl. ............... 348/222.1; 348/223.1; 348/223.6; 348/227.1
(58) Field of Classification Search ............... 348/221.1, 348/222.1, 223.1, 226.1, 227.1, 228.1
See application file for complete search history.

(56) References Cited

U.S. PATENT DOCUMENTS

| | | | | |
|---|---|---|---|---|
| 4,256,131 A | * | 3/1981 | De Remigis | 137/3 |
| 5,363,197 A | * | 11/1994 | Ohno et al. | 356/405 |
| 5,375,193 A | * | 12/1994 | Adams, Jr. | 345/603 |
| 5,428,720 A | * | 6/1995 | Adams, Jr. | 345/604 |
| 5,929,906 A | | 7/1999 | Arai et al. | |
| 6,075,563 A | * | 6/2000 | Hung | 348/223.1 |
| 6,545,710 B1 | * | 4/2003 | Kubo et al. | 348/223.1 |
| 6,628,822 B1 | * | 9/2003 | Nakabayashi et al. | 382/162 |
| 6,856,354 B1 | * | 2/2005 | Ohsawa | 348/370 |
| 7,239,315 B2 | * | 7/2007 | Kim et al. | 345/426 |
| 7,599,093 B2 | * | 10/2009 | Kagaya | 358/2.1 |
| 7,830,566 B2 | * | 11/2010 | Yamada et al. | 358/518 |
| 7,839,406 B2 | * | 11/2010 | Kerofsky | 345/473 |
| 7,894,000 B2 | * | 2/2011 | Gutta et al. | 348/603 |
| 8,063,992 B2 | * | 11/2011 | Gutta et al. | 348/603 |
| 2001/0005429 A1 | * | 6/2001 | Ishiga et al. | 382/167 |

(Continued)

FOREIGN PATENT DOCUMENTS

JP H9-163382 A 6/1997

(Continued)

OTHER PUBLICATIONS

Office Action dated Nov. 15, 2011 in related Japanese Patent Application No. 2007-189710. (with English language translation).

*Primary Examiner* — John Villecco
*Assistant Examiner* — Selam Gebriel
(74) *Attorney, Agent, or Firm* — Oliff & Berridge, PLC

(57) ABSTRACT

A proposition is to perform a high accurate chromatic coordinate conversion of a chromaticity value generated by a color sensor into a chromaticity value of a predetermined chromaticity coordinate system, and to perform an accurate color-reproduction. A chromatic coordinate converting apparatus includes a recording unit recording information representing a chromaticity coordinate system unique to the color sensor in advance, and a converting unit performing a chromatic coordinate conversion of a first chromaticity value being a chromaticity value generated by the color sensor into a second chromaticity value of the predetermined chromatic coordinate system based on the information recorded by the recording unit.

19 Claims, 12 Drawing Sheets

U.S. PATENT DOCUMENTS

| | | | |
|---|---|---|---|
| 2001/0017627 A1* | 8/2001 | Marsden et al. | 345/501 |
| 2002/0196456 A1* | 12/2002 | Komiya et al. | 358/1.9 |
| 2003/0142222 A1* | 7/2003 | Hordley | 348/223.1 |
| 2004/0109562 A1* | 6/2004 | Ohnishi | 380/200 |
| 2004/0252303 A1* | 12/2004 | Giorgianni et al. | 356/402 |
| 2005/0051742 A1* | 3/2005 | Shiraishi | 250/548 |
| 2005/0162542 A1* | 7/2005 | Nakayama | 348/362 |
| 2005/0275911 A1* | 12/2005 | Yamada et al. | 358/518 |
| 2006/0033860 A1* | 2/2006 | Okishiro et al. | 349/70 |
| 2006/0066912 A1* | 3/2006 | Kagaya | 358/302 |
| 2006/0077125 A1* | 4/2006 | Floyd | 345/32 |
| 2006/0119713 A1* | 6/2006 | Deguchi et al. | 348/231.7 |
| 2006/0146326 A1* | 7/2006 | Nagashima et al. | 356/328 |
| 2006/0158881 A1* | 7/2006 | Dowling | 362/231 |
| 2006/0164663 A1* | 7/2006 | Luo et al. | 358/1.9 |
| 2006/0181529 A1* | 8/2006 | Kim et al. | 345/426 |
| 2008/0100858 A1* | 5/2008 | Kondo | 358/1.9 |
| 2009/0196499 A1* | 8/2009 | Matsushiro et al. | 382/167 |
| 2009/0310154 A1* | 12/2009 | Morovic et al. | 358/1.9 |

FOREIGN PATENT DOCUMENTS

| | | |
|---|---|---|
| JP | A-2001-358960 | 12/2001 |
| JP | B2-3803441 | 5/2006 |

\* cited by examiner

| (R,G,B) | (L,a,b) |
|---|---|
| (0,0,0) | (×,×,×) |
| ... | ... |
| (255,255,255) | (×,×,×) |

CHROMATIC COORDINATE CONVERTING APPARATUS, IMAGING APPARATUS, COMPUTER READABLE RECORDING MEDIUM, AND CREATING METHOD OF CHROMATIC COORDINATE CONVERTING TABLE

CROSS-REFERENCE TO RELATED APPLICATION

This application is based upon and claims the benefit of priority from Japanese Patent Application No. 2007-189710, filed on Jul. 20, 2007, the entire contents of which are incorporated herein by reference.

BACKGROUND

1. Field

The present embodiments relate to a chromatic coordinate converting apparatus performing a chromatic coordinate conversion of a chromatic value generated by a tricolor imaging device and so on into a chromatic value represented by a predetermined chromaticity coordinate system (a general chromaticity coordinate system reflecting human visual characteristics such as a chromaticity coordinate system of a CIE calorimetric system), a computer readable recording medium, and a creating method of a chromatic coordinate converting table. Besides, the present embodiments relates to an imaging apparatus including the chromatic coordinate converting apparatus.

2. Description of the Related Art

An RGB color imaging device of single panel type is used for a general electronic camera. A spectral sensitivity characteristic of this color imaging device is approximated to a color-matching function of a CIE-XYZ calorimetric system, but they are not matched exactly.

Accordingly, in the electronic camera, for example, an RGB value generated by the color imaging device is performed a chromatic coordinate conversion into an XYZ value by a 3×3 matrix. A method in which the spectral sensitivity characteristic of the color imaging device is taken into consideration to optimize elements of the matrix is disclosed in Patent Document 1. It becomes possible to perform comparatively accurate color reproduction for various display devices by using the XYZ value in which the chromatic coordinate conversion is performed with this matrix (Patent Document 1: Patent Publication No. 3803441).

However, it cannot be said that this matrix can perform the chromatic coordinate conversion of RGB values of all color generated by the color imaging device accurately. For example, when an optimization is performed so that the chromatic coordinate conversion of the RGB value in standard chroma is performed accurately, a conversion error of the RGB value in high chroma should be tolerated.

SUMMARY

A proposition of the present invention is to provide a chromatic coordinate converting apparatus capable of performing a chromatic coordinate conversion of a chromaticity value generated by a color sensor into a chromaticity value of a predetermined chromatic coordinate system with high accuracy, a computer readable recording medium, and a creating method of chromatic coordinate converting table. Besides, another proposition of the present invention is to provide an imaging apparatus capable of surely performing an accurate color-reproduction.

A chromatic coordinate converting apparatus of the present invention includes a recording unit recording information representing a chromaticity coordinate system unique to a color sensor in advance, and a converting unit performing a chromatic coordinate conversion of a first chromaticity value being a chromaticity value generated by the color sensor into a second chromaticity value of a predetermined chromaticity coordinate system based on the information recorded by the recording unit.

Incidentally, the converting unit may obtain the second chromaticity value by estimating a spectroscopic characterization of incident light for the color sensor based on the information and the first chromaticity value, and thereafter, by representing the spectroscopic characterization by the predetermined chromaticity coordinate system.

Besides, the recording unit may record information of a plurality of reference chromaticity values generated by the color sensor in accordance with each of a plurality of reference lights of which spectroscopic characterizations are already known, and the converting unit may estimate the spectroscopic characterization of the incident light by performing a weighting synthesis of the spectroscopic characterizations of the plurality of reference lights with a weighting ratio in accordance with a relation between the plurality of reference chromaticity values and the first chromaticity value.

Besides, the plurality of reference lights are desirable to be composed of a plurality of monochromatic lights different from one another within a visual light range.

Besides, the plurality of reference lights may be composed of a plurality of monochromatic lights different from one another within a visual light range and white light.

Besides, the converting unit may estimate a part of the spectroscopic characterization of the incident light by assuming a closed curve connecting the plurality of reference chromaticity values in the unique chromaticity coordinate system, and one straight line passing on the first chromaticity value, and by performing the weighting synthesis of the spectroscopic characterizations of the reference lights having colors corresponding to intersection points of the closed curve and the straight line among the plurality of reference lights, and estimate a whole of the spectroscopic characterization of the incident light by repeating the estimation while changing the straight line to obtain a plurality of estimated results, and by superimposing the above-stated estimated results.

Besides, the converting unit may take off the estimated result from an object of the superimposing when the straight line is a straight line intersecting a red-violet light of the closed curve.

Besides, the superimposing is a weighting superimposing, and the converting unit may set the weighting ratio of the weighting superimposing in accordance with a spectroscopic characterization of a light source illuminating an object of detection of the color sensor.

Besides, an imaging apparatus of the present invention includes a color imaging device, and any one of chromatic coordinate converting apparatuses according to the present invention performing a chromatic coordinate conversion of a chromaticity value generated by the color imaging device.

Besides, a computer readable recording medium of the present invention for causing a computer to execute a chromatic coordinate converting program includes a recording operation recording information representing a chromaticity coordinate system unique to a color sensor in advance, and a converting operation performing a chromatic coordinate conversion of a first chromaticity value being a chromaticity value generated by the color sensor into a second chromaticity value of a predetermined chromaticity coordinate system based on the information recorded in the recording operation.

Incidentally, the second chromaticity value may be obtained by estimating a spectroscopic characterization of incident light for the color sensor based on the information and the first chromaticity value, and thereafter, by representing the spectroscopic characterization by the predetermined chromaticity coordinate system, in the converting operation.

Besides, a plurality of reference chromaticity values generated by the color sensor in accordance with each of a plurality of reference lights of which spectroscopic characterizations are already known may be recorded, in the recording operation, and the spectroscopic characterization of the incident light may be estimated by performing a weighting synthesis of the spectroscopic characterizations of the plurality of reference lights with a weighting ratio in accordance with a relation between the plurality of reference chromaticity values and the first chromaticity value, in the converting operation.

Besides, the plurality of reference lights are desirable to be composed of a plurality of monochromatic lights different from one another within a visual light range.

Besides, the plurality of reference lights may be composed of a plurality of monochromatic lights different from one another within a visual light range and white light.

Besides, a part of the spectroscopic characterization of the incident light is estimated by assuming a closed curve connecting the plurality of reference chromaticity values in the unique chromaticity coordinate system and one straight line passing on the first chromaticity value, and by performing a weighting synthesis of spectroscopic characterizations of reference lights having colors corresponding to intersection points of the closed curb and the straight line among the plurality of reference lights, and a whole of the spectroscopic characterization of the incident light may be estimated by repeating the estimation while changing the straight line to obtain a plurality of estimated results and by superimposing the above-stated estimated results, in the converting operation.

Besides, the estimated result when the straight line is a straight line intersecting a red-violet light of the closed curve may be taken off from an object of the superimposing, in the converting operation.

Besides, the superimposing is a weighting superimposing, and the weighting ratio of the weighting superimposing may be set in accordance with a spectroscopic characterization of a light source illuminating an object of detection of the color sensor, in the converting operation.

Besides, a creating method of chromatic coordinate converting table of the present invention includes notifying a correspondence between a chromaticity coordinate system unique to a color sensor and a predetermined chromaticity coordinate system, and creating the chromatic coordinate converting table to perform a chromatic coordinate conversion of a first chromaticity value being a chromaticity value generated by the color sensor into a second chromaticity value of the predetermined chromaticity coordinate system based on the correspondence.

DETAILED DESCRIPTION OF THE EMBODIMENTS

[Embodiments]

Hereinafter, a first embodiment of the present invention is described. The present embodiment is an embodiment of a camera system.

Figure 1:
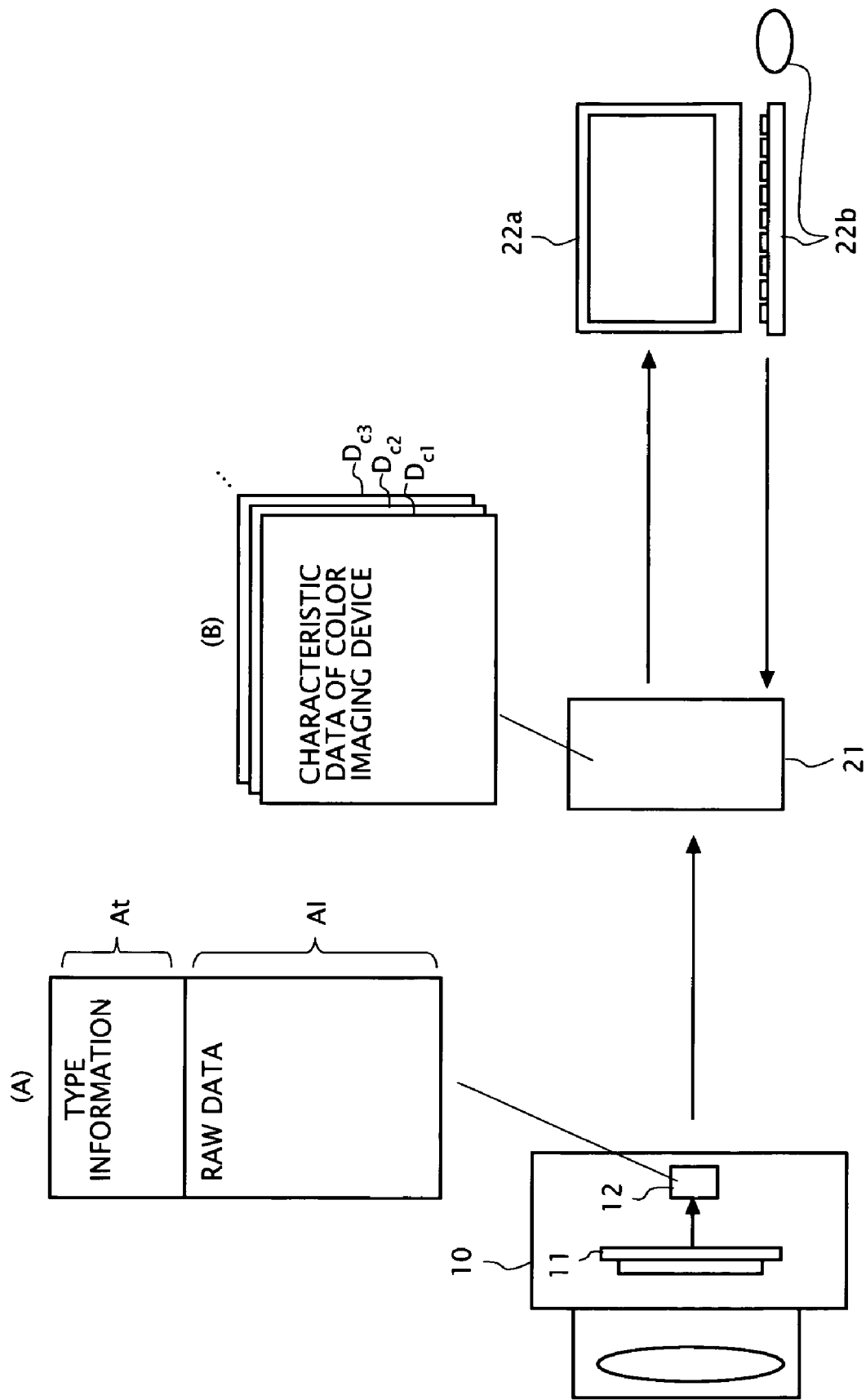
FIG. 1 is a configuration chart of a camera system.

FIG. 1 is a configuration chart of a camera system. As shown in FIG. 1, the camera system includes an electronic camera 10, a computer 21, a monitor 22a, an inputting device 22b, and so on.

A color imaging device of single panel type 11 is included in the electronic camera 10. The color imaging device 11 is, for example, an RGB color imaging device in a Bayer array.

A pixel interpolation processing (a deBayer processing) is performed for an image data generated by the color imaging device 11 at the electronic camera 10. Here, the image data after the interpolation processing is an image data of an RAW image, and hereinafter, referred to as an "RAW data". This RAW data is written to an image file at the electronic camera 10, and stored into a memory 12 (a card memory and so on) of the electronic camera 10. At this time, the RAW data is written to an image storage area A1 of the image file as shown by (A) in FIG. 1, and type information of the electronic camera 10 is written to a tag area At of the image file. After that, the electronic camera 10 performs a communication with the computer 21, and transfers the image file to the computer 21.

A chromatic coordinate converting program to perform a chromatic coordinate conversion of the RAW data is installed on the computer 21. Hereinafter, contents of this chromatic coordinate converting program are described as operations of the computer 21.

The computer 21 stores types of color imaging devices mounted on each of various types of electronic cameras.

Besides, the computer 21 stores characteristic data $D_{c1}$, $D_{c2}$, $D_{c3}$, ... of various types of color imaging devices as shown by (B) in FIG. 1.

The computer 21 refers to the tag area At of the image file of the RAW data at the time of the chromatic coordinate conversion of the RAW data, recognizes the type of the electronic camera which obtained the RAW data, and recognizes the type of the color imaging device mounted on the electronic camera. The computer 21 selects the characteristic data corresponding to the color imaging device from among the characteristic data $D_{c1}$, $D_{c2}$, $D_{c3}$, ..., and sets as the characteristic data to be used for the chromatic coordinate conversion.

Here, there are chromaticity characteristic data and summational sensitivity characteristic data in the characteristic data of the color imaging device. The chromaticity characteristic data is the one in which responses of a spectral sensitivity characteristic of the color imaging device at each wavelength are shown by sequence of points of an rg chromaticity coordinate system. The summational sensitivity characteristic data is the one derived from a total sum of the responses of the spectral sensitivity characteristic of the color imaging device at each wavelength.

These characteristic data are, for example, obtained by a manufacturer of the electronic camera mounting the color imaging device as described below.

Figure 2:
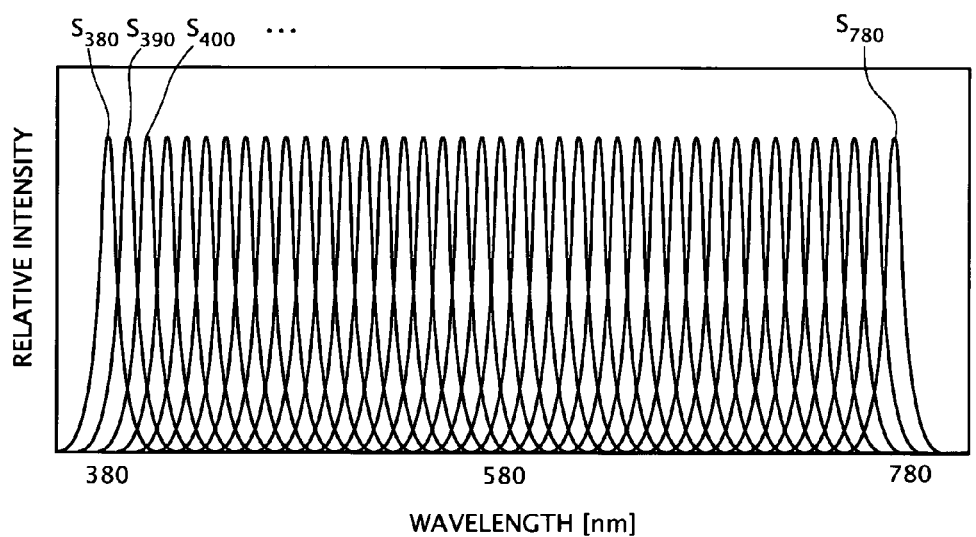
FIG. 2 is a view describing spectroscopic characterizations of a plurality of reference lights.

At first, the manufacturer makes a plurality of reference lights having equal intensity and different colors incident on the electronic camera. Here, the plurality of reference lights are set to be 41 kinds of monochromatic lights with different wavelengths by 10 nm each within a visual light range (monochromatic light with wavelength of 380 nm, monochromatic light with wavelength of 390 nm, monochromatic light with wavelength of 400 nm, ..., and monochromatic light with wavelength of 780 nm) as shown in FIG. 2. Besides, half breadths of spectroscopic characterizations $S_{380}$, $S_{390}$, $S_{400}$, ..., and $S_{780}$ of the individual reference lights are set to be 10 nm respectively.

Further, the manufacturer refers to RGB values of the RAW data in which the electronic camera generates individually in accordance with the respective reference lights. The respective RGB values corresponding to the respective reference lights are, for example, as shown by solid lines in FIG. 3. These solid lines represent the spectral sensitivity characteristics of the color imaging device.

Besides, a sum of these RGB values (hereinafter, called as "an RGB brightness value") are as shown by a dotted line in FIG. 3. This dotted line represents the summational sensitivity characteristic of the color imaging device.

Next, the manufacturer converts the respective RGB values corresponding to the respective reference lights into rg values by an expression (1).

$$\begin{cases} r = R/(R+G+B) \\ g = G/(R+G+B) \end{cases} \quad (1)$$

Figure 4:
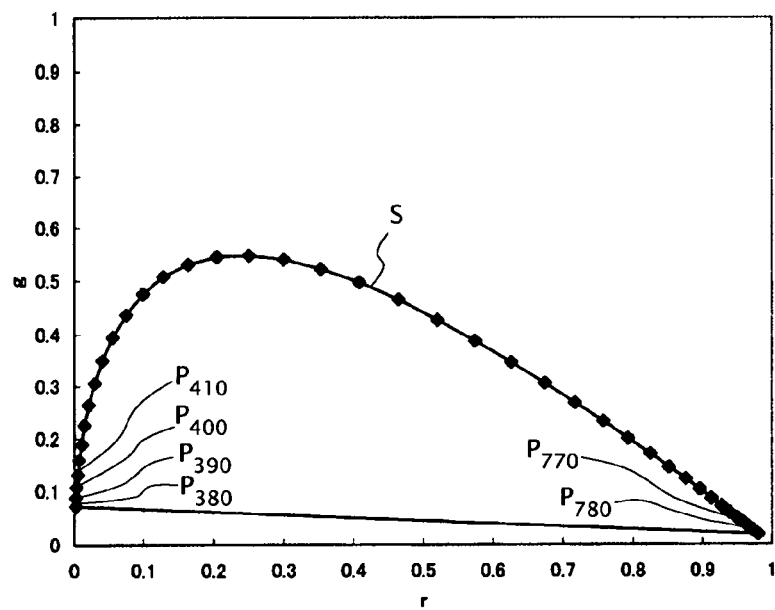
FIG. 4 is a view representing RGB values of the reference lights by points on an rg chromaticity coordinate system.
Figure 5:
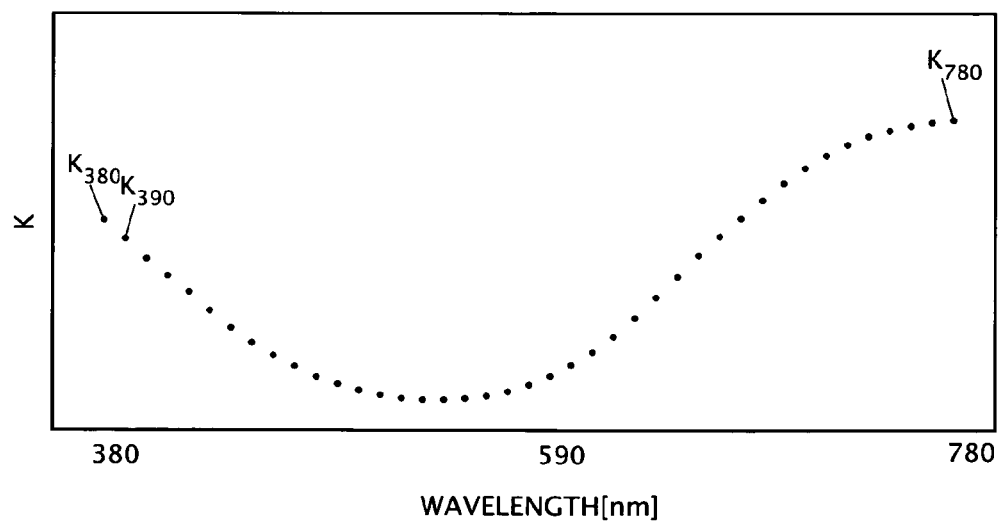
FIG. 5 is a view showing normalization coefficients K.

Accordingly, chromaticities of the respective reference lights are represented by points $P_{380}$, $P_{390}$, ..., and $P_{780}$ on an rg chromaticity coordinate system unique to the color imaging device, as shown in FIG. 4. These points $P_{380}$, $P_{390}$, ..., and $P_{780}$ are the chromaticity characteristic data of the color imaging device.

Incidentally, a subscript "k" of a point $P_k$ represents a wavelength of the reference light corresponding to the point $P_k$. For example, the point $P_{380}$ represents the chromaticity of the reference light with the wavelength of 380 nm by the rg chromaticity coordinate system unique to the color imaging device, and the point $P_{780}$ represents the chromaticity of the reference light with the wavelength of 780 nm by the rg chromaticity coordinate system unique to the color imaging device. Hereinafter, each of these points $P_{380}$, $P_{390}$, ..., and $P_{780}$ are called as "reference points", and the rg chromaticity coordinate system unique to the color imaging device is just called as the "rg chromaticity coordinate system".

Figure 3:
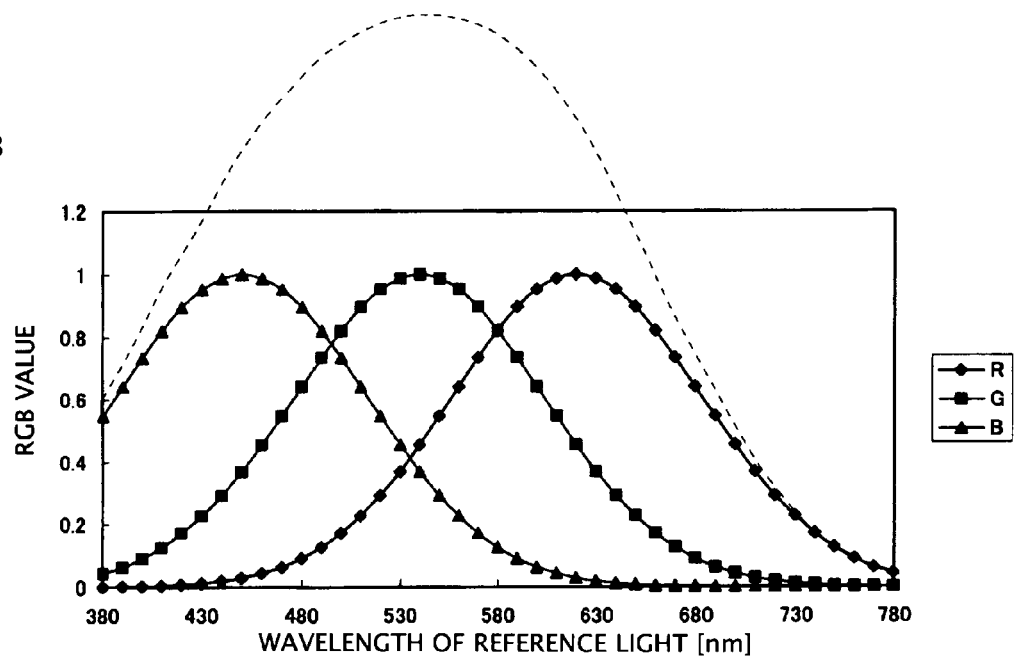
FIG. 3 is a view showing spectral sensitivity characteristics of a color imaging device.

Besides, the manufacturer generates a coefficient group $K_{380}$, $K_{390}$, ..., and $K_{780}$ corresponding to reciprocals of the RGB brightness values based on the summational sensitivity characteristic of the color imaging device (the dotted line in FIG. 3). These coefficient group $K_{380}$, $K_{390}$, ..., and $K_{780}$ are the summational sensitivity characteristic data of the color imaging device. A subscript "k" of a coefficient $K_k$ represents a wavelength of the reference light corresponding to the coefficient $K_k$. For example, the coefficients $K_{380}$, $K_{780}$ are the coefficients corresponding to the reference lights with the wavelengths of 380 nm and 780 nm.

Here, a case is considered when two kinds of reference lights with the wavelengths of 380 nm and 780 nm are respectively incident on the color imaging device. At this time, the RGB values generated by the color imaging device become different from one another even if the intensity of the reference lights are the same (refer to the dotted line in FIG. 3). However, if spectroscopic characterizations of the reference lights are multiplied by the coefficients $K_{380}$, $K_{780}$ in advance, the RGB brightness values of these reference lights become equal with each other. Namely, the coefficient $K_k$ is a normalization coefficient to normalize the RGB brightness value of each reference light. Accordingly, the coefficient $K_k$ is just called as a "normalization coefficient" in the following.

Next, a meaning of a positional relationship on the rg chromaticity coordinate system is considered.

Figure 6:
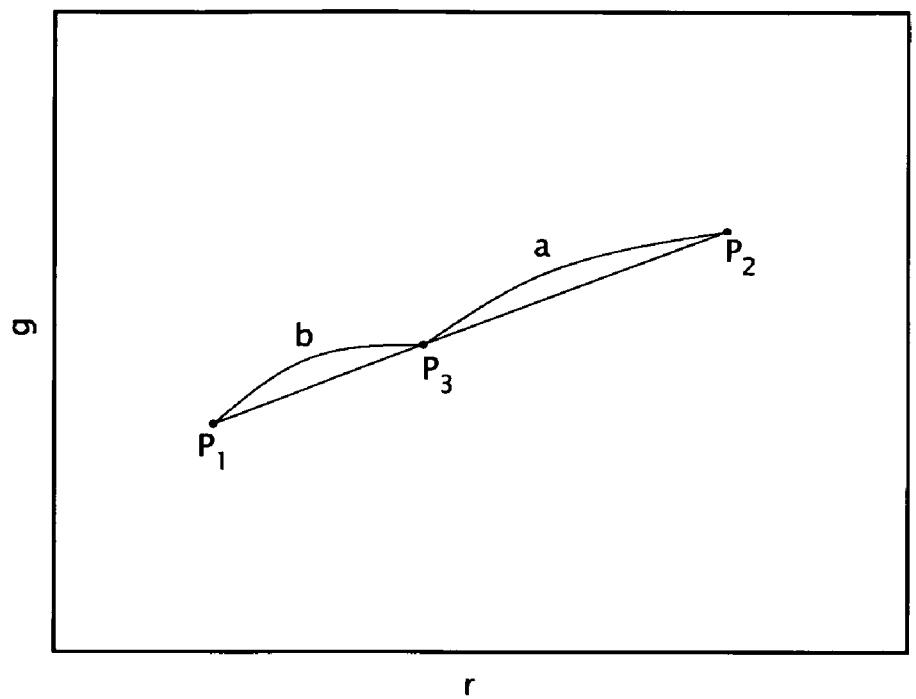
FIG. 6 is a view describing a meaning of a positional relationship on the rg chromaticity coordinate system.

As shown in FIG. 6, when two color lights represented by two arbitrary points $P_1$ $(r_1, g_1)$, $P_2(r_2, g_2)$ on the rg chromaticity coordinate system are represented by the RGB values, each of them become as shown in an expression (2). Incidentally, here, it is assumed that the RGB brightness values of the two color lights are equal, and the RGB brightness value of these color lights is set as "A" $(A=R+G+B)$.

$$P_1 : A \begin{pmatrix} r_1 \\ g_1 \\ 1 - r_1 - g_1 \end{pmatrix} \quad (2)$$

$$P_2 : A \begin{pmatrix} r_2 \\ g_2 \\ 1 - r_2 - g_2 \end{pmatrix}$$

Accordingly, when the two color lights represented by the points $P_1$, $P_2$ on the rg chromaticity coordinate system, and having the equal RGB brightness value are performed a weighting synthesis with a weighting ratio of "a:b", an RGB value of a synthesized light becomes as shown by an expression (3).

$$P_3 : \begin{pmatrix} aAr_1 + bAr_2 \\ aAg_1 + bAg_2 \\ aA - aAr_1 - aAg_1 + bA - bAr_2 - Abg_2 \end{pmatrix} \quad (3)$$

When the RGB value of this synthesized light is represented by a point $P_3$ on the rg chromaticity coordinate system, it becomes as shown in an expression (4).

$$P_3 : \left( \frac{ar_1 + br_2}{a+b}, \frac{ag_1 + bg_2}{a+b} \right) \quad (4)$$

It can be seen from the expression (4) that this point $P_3$ is the point internally dividing a line segment $P_1 P_2$ with an internal division ratio of "b:a" on the rg chromaticity coordinate system. Here the relationship of two light positions (chromaticity coordinates) in an rg chromaticity coordinate space, a weighting ratio of their positions when the weighting synthesis is performed, and chromaticity coordinates of the synthesized light is illustrated. The similar relationship can be established in an xy chromaticity coordinate space by replacing an rg chromaticity with an xy chromaticity, and a RGB brightness value with a XYZ brightness value (=X+Y+Z). That is, an xy chromaticity coordinates of the synthesized light can be calculated when xy chromaticity coordinates of two lights and their weighting ratios of when the weighting synthesis is performed are known.

Namely, when the two color lights represented by the points $P_1$, $P_2$ on the rg chromaticity coordinate system, and having the equal RGB brightness value are performed the weighting synthesis with the weighting ratio of "a:b", a color of the synthesized light is represented by the point $P_3$ internally dividing the line segment $P_1 P_2$ on the rg chromaticity coordinate system with the internal division ratio of "b:a". Accordingly, the color of the light represented by the arbitrary point $P_3$ on the rg chromaticity coordinate system becomes the same color with the synthesized light in which the RGB brightness values of the two lights corresponding to both end points $P_1$, $P_2$ of the arbitrary line segment $P_1 P_2$ passing on the point $P_3$ are aligned, and thereafter synthesized with the internal division ratio of "a:b".

Based on the above, a procedure in which the computer 21 performs a chromatic coordinate conversion of the RAW data is described in detail.

Figure 7:
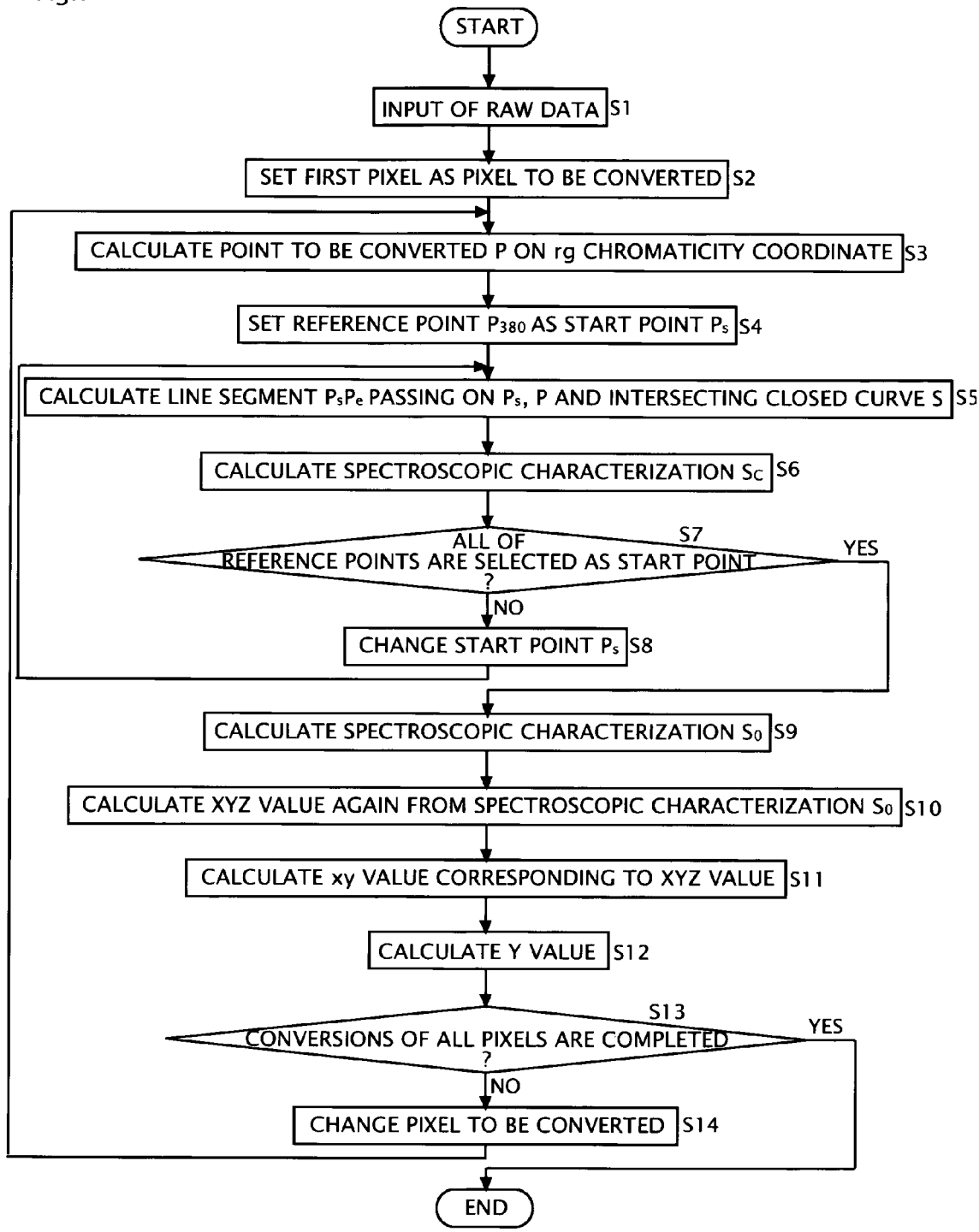
FIG. 7 is an operation flowchart of a computer 21 relating to a chromatic coordinate conversion.

FIG. 7 is an operation flowchart of the computer 21 relating to the chromatic coordinate conversion. This chromatic coordinate conversion is to convert an RAW data (RGB value) generated by the color imaging device into a data (Yxy value) represented by a CIE 1931 XYZ colorimetric system.

Step S1: The computer 21 displays a list of image files storing the RAW data on the monitor 22a, to make a use specify one of them. The computer 21 recognizes contents specified by the user via the inputting device 22b, reads the RAW data of the specified image file, and selects a characteristic data (FIG. 8) to be used for the chromatic coordinate conversion.

Step S2: The computer 21 selects a first pixel of the read RAW data as a pixel to be converted.

Figure 8:
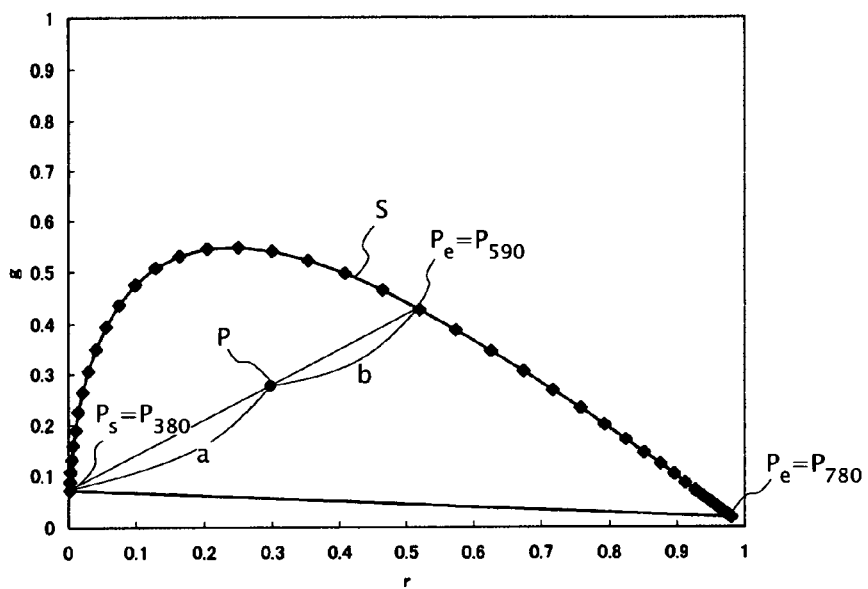
FIG. 8 is a view describing step S5.

Step S3: The computer 21 converts an RGB value of the pixel to be converted into an rg value by the expression (1). A point P in FIG. 8 represents the rg value after conversion by a point on the rg chromaticity coordinate system. Hereinafter, this point P is called as a "point to be converted".

As shown in FIG. 8, the point to be converted P positions inside a closed curve S even if any color the light which actually incident on the pixel to be converted of the color imaging device (hereinafter, just called as "incident light") has. Incidentally, the closed curve S is a closed curve created by connecting the reference points $P_{380}, \ldots, P_{780}$ in wavelength order, and thereafter, connecting the reference point $P_{780}$ and the reference point $P_{380}$.

Incidentally, information of a brightness component is lost when the RGB value is converted into the rg value in this step, but the information of the brightness component is extracted separately in a later step S12.

Step S4: The computer 21 selects the reference point corresponding to a minimal wavelength (reference point $P_{380}$) as a start point $P_s$ from among the reference points $P_{380}, P_{390}, \ldots, P_{780}$ shown in FIG. 8.

Step S5: The computer 21 calculates a line segment $P_s P_e$ starting from the start point $P_s$ shown in FIG. 8 and intersecting the closed curve S via the point to be converted P, and respectively calculates a length "a" of the line segment $P_s P$, a length "b" of the line segment $PP_e$.

Figure 9:
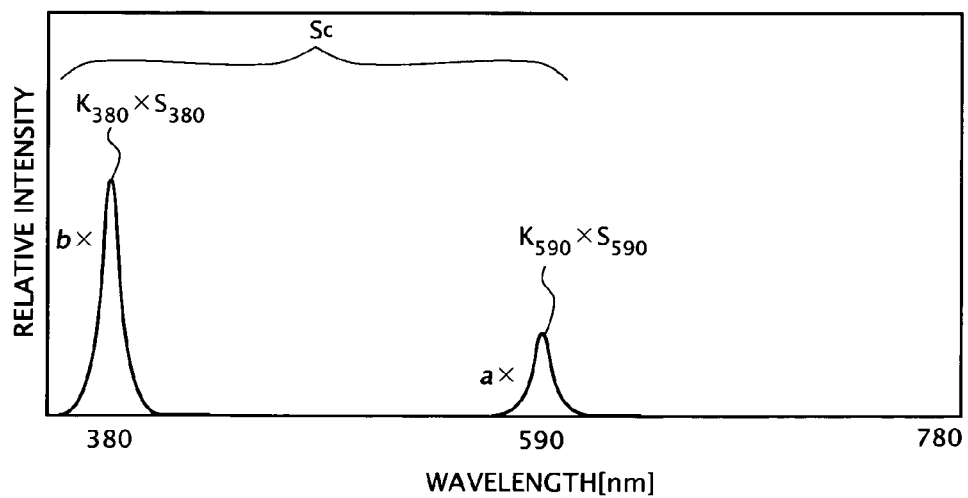
FIG. 9 is a view describing step S6.

Step S6: The computer 21 detects the reference light corresponding to the start point $P_s$ (here, the reference light with the wavelength of 380 nm) and the reference light corresponding to the end point $P_e$ (here, the reference light with the wavelength of 590 nm), multiplies the spectroscopic characterizations $S_{380}$, $S_{590}$ of these reference lights by the normalization coefficients $K_{380}$, $K_{590}$ as shown in FIG. 9, and thereafter, performs the weighting synthesis with the weighting ratio of "b:a". The weighting synthesis is represented by an expression (5).

$$S_c = b K_{380} S_{380} + a K_{590} S_{590} \quad (5)$$

It is conceivable that the spectroscopic characterization Sc obtained by this weighting synthesis represents a part of the spectroscopic characterization of the incident light.

Step S7: The computer 21 judges whether all of the reference points $S_{380}, S_{390}, \ldots, S_{780}$ are already selected as the start point $P_s$ or not. When not all of the reference points are selected, the process goes to step S8, and when all of them are already selected, the process goes to step S9.

Step S8: The computer 21 changes the start point $P_s$ to the next reference point, and goes back to the step S5.

Accordingly, the calculations of the spectroscopic characterization Sc in the steps S5, S6 are repeated until all of the reference points $P_{380}, P_{390}, \ldots, P_{780}$ are selected as the start point $P_s$.

Figure 10:
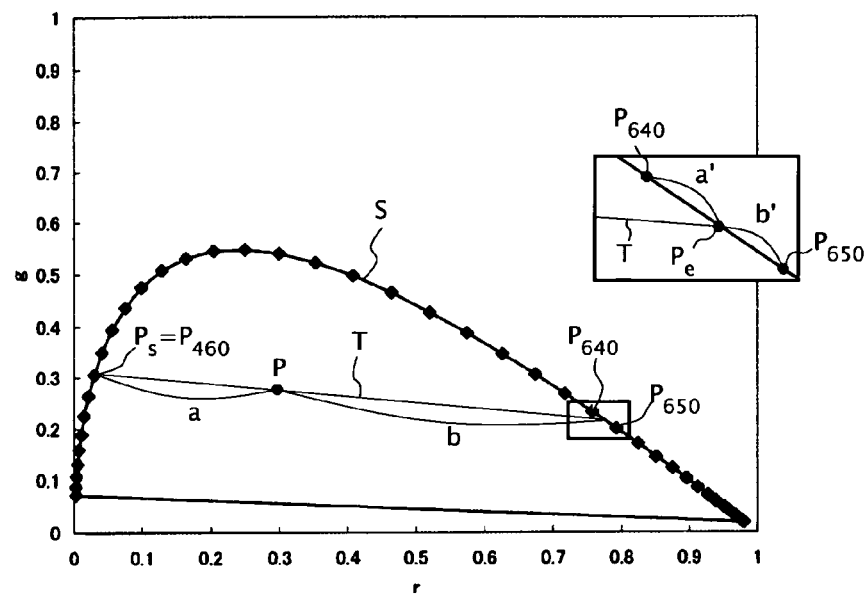
FIG. 10 is a view describing another case of the step S5.
Figure 11:
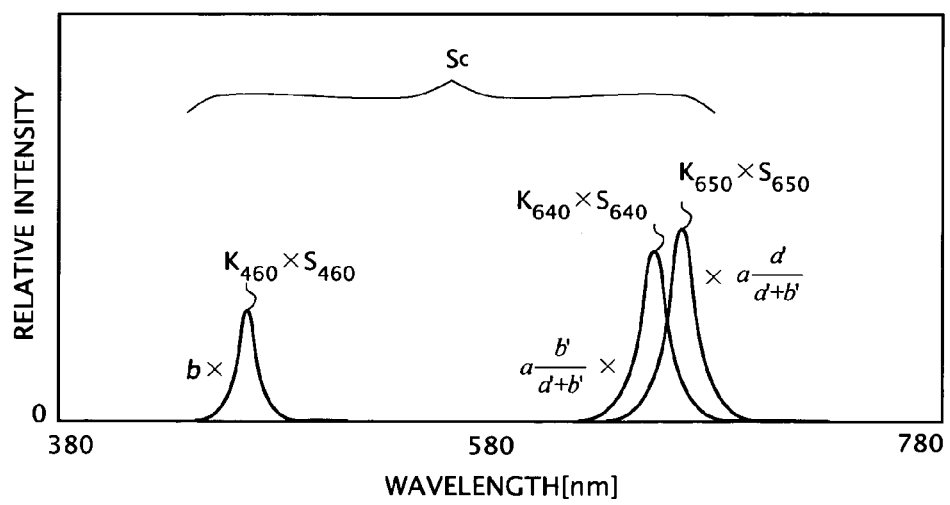
FIG. 11 is a view describing another case of the step S6.

Here, in the above-stated step S5, there is a possibility in which the end point $P_e$ positions between the two reference points as shown in FIG. 10. In FIG. 10, a state is shown in which the reference point $P_{460}$ is selected as the start point $P_s$, and the end point $P_e$ positions between the reference points $P_{640}$, $P_{650}$. In the step S5 in this case, it is necessary to calculate not only the lengths "a, b", but also a length "a'" of a line segment $P_{640} P_e$ and a length "b'" of a line segment $P_e P_{650}$ respectively. In this case, three spectroscopic characterizations $S_{460}$, $S_{640}$, $S_{650}$ become objects to be synthesized in the weighting synthesis of the next step S6.

Incidentally, the weighting synthesis can be shown by an expression (6).

$$S = b K_{460} S_{460} + a \left( \frac{b'}{a' + b'} K_{640} S_{640} + \frac{a'}{a' + b'} K_{650} S_{650} \right) \quad (6)$$

This expression (6) represents that the weighting synthesis is performed with the weighting ratio of "b:a" on the one in which the two spectroscopic characterizations $S_{640}$, $S_{650}$ are multiplied by the normalization coefficients $K_{640}$, $K_{650}$, and thereafter, the weighting synthesis is performed with the weighting ratio of "b':a'", and the one in which the spectroscopic characterization $S_{460}$ is multiplied by the normalization coefficient $K_{460}$.

Step S9: The computer 21 calculates a spectroscopic characterization $S_0$ by superimposing the plurality of spectroscopic characterizations $S_c$ calculated at each of the steps S5, S6. This superimposing may be either a weighting superimposing or a simple superimposing, but here, the latter one is adopted for simplicity.

Figure 12:
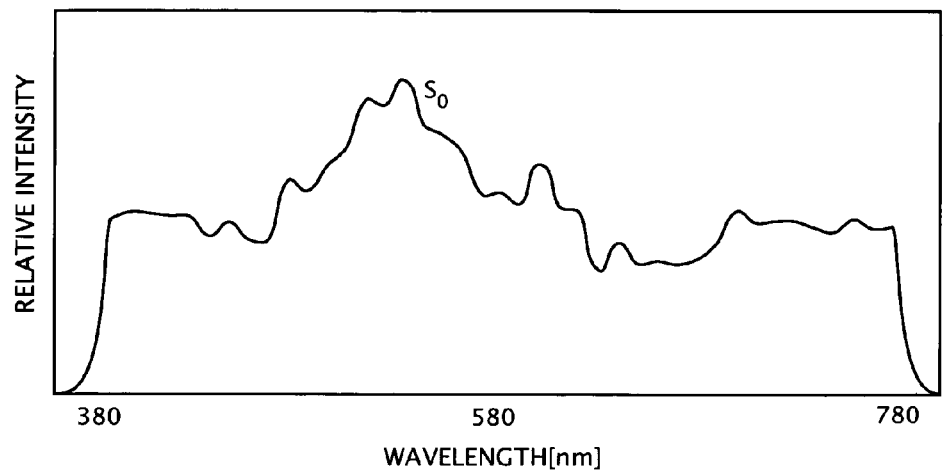
FIG. 12 is an image of a spectroscopic characterization $S_0$ calculated at the step S9.

An image of the calculated spectroscopic characterization $S_0$ is as shown in FIG. 12. A form of curve of this spectroscopic characterization $S_0$ is the one in which total form of the curve of the spectroscopic characterization of the incident light is estimated. Incidentally, the form of the curve drawn in FIG. 12 is an example.

Figure 13:
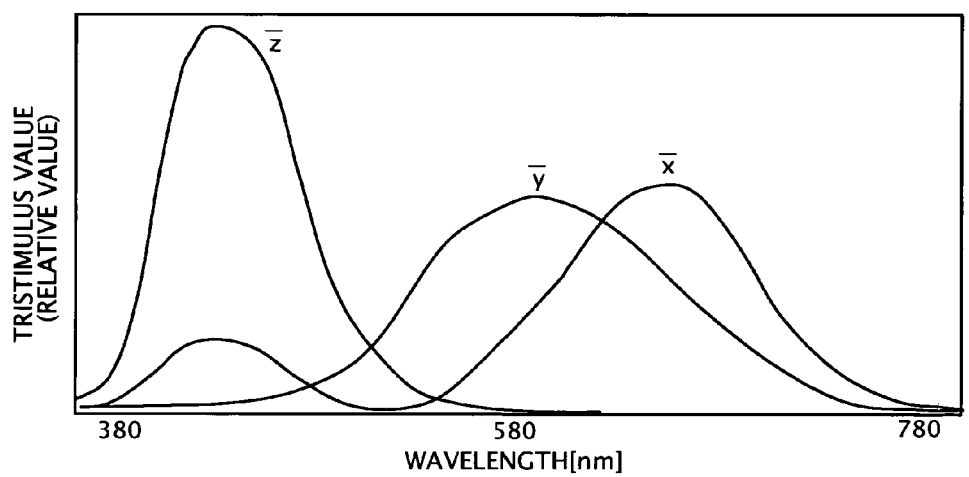
FIG. 13 is a color-matching function of a CIE 1931 XYZ colorimetric system.

Step S10: The computer 21 obtains an XYZ value by taking a scalar product between the spectroscopic characterization $S_0$ (refer to FIG. 12) and a color-matching function of the CIE 1931 XYZ colorimetric system (refer to FIG. 13). This XYZ value corresponds to the one representing the color of the incident light by the CIE 1931 XYZ calorimetric system. However, a brightness component of the XYZ value is not used for the calculation.

Step S11: The computer 21 converts the XYZ value into an xy value by an expression (7).

$$\begin{cases} x = X/(X+Y+Z) \\ y = Y/(X+Y+Z) \end{cases} \tag{7}$$

Step S12: The computer 21 generates a Y value from the RGB value of the pixel to be converted by an expression (8). Respective characters "s", "t", "u" in the expression (8) are values which can be determined depending on the spectral sensitivity characteristic of the color imaging device, and they are optimized in advance.

$$Y = sR + tG + uB \tag{8}$$

The obtained Y value represents the brightness value of the incident light. The computer 21 therefore obtains a Yxy value by combining the Y value and the xy value obtained at the step S11. As a result, the RGB value of the pixel to be converted is performed the chromatic coordinate conversion into the Yxy value independent from the characteristics of the color imaging device.

Step S13: The computer 21 judges whether the chromatic coordinate conversion relating to all pixels of the RAW data are completed or not, advances the process to step S14 when it is not completed yet, and finishes the flowchart when it is completed.

Step S14: The computer 21 changes the pixel to be converted to the next pixel, and returns to the step S3. Accordingly, the steps S3 to S12 are repeated until the chromatic coordinate conversions of all pixels of the RAW data are completed.

As stated above, the computer 21 of the present embodiment records the response of the color imaging device for the plurality of reference lights (FIG. 2) of which spectroscopic characterizations are already known as the characteristic data of the color imaging device (FIG. 8) in advance.

The computer 21 calculates the spectroscopic characterization $S_0$ of the incident light based on the RGB value and the characteristic data (FIG. 8) (steps S3 to S9), then represents the spectroscopic characterization $S_0$ (FIG. 12) by the CIE 1931 XYZ colorimetric system (FIG. 13) again (step S10), and obtains the xy value (step S11) when the RGB value of the RAW data is performed the chromatic coordinate conversion. Accordingly, an accuracy of the chromatic coordinate conversion by the computer 21 is high.

Modification Example of Embodiment

Figure 14:
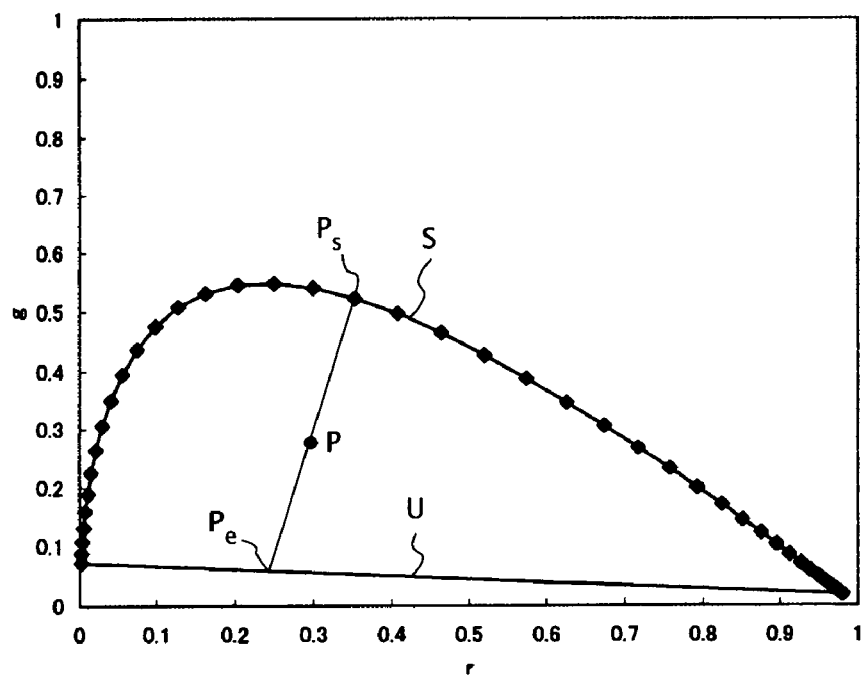
FIG. 14 is a view describing a modification example of the step S9.

Incidentally, the computer 21 of the above-stated embodiment sets an object of the superimposing in the step S9 as all of the spectroscopic characterizations $S_c$ calculated at the steps S5, S6, but there is a case when the spectroscopic characterization $S_c$ is preferable to be taking off from the object of the superimposing when the end point $P_e$ positions on a red-violet light U as shown in FIG. 14 depending on a type of a light source illuminating a subject. Incidentally, the red-violet light U is a comparatively long straight line connecting the reference point $P_{380}$ and the reference point $P_{780}$.

Besides, the computer 21 of the above-described embodiment calculates the xy chromaticity coordinates by performing spectroscopy estimation of incident light, but the computer 21 may also obtain the same by calculating the xy chromaticity of the synthesized light from the xy chromaticity of the reference lights and the weighting ratio of the reference lights. As described above, the xy chromaticity coordinates of the synthesized light can be obtained when the xy chromaticity coordinates of two lights and their weighting ratio of when the weighting synthesis is performed are known.

Besides, the computer 21 of the above-stated embodiment performs the superimposing in the step S9 as the simple superimposing, but it may be the weighting superimposing. In case of the weighting superimposing, the spectroscopic characterization of the light source illuminating the subject may be reflected to the weighting ratio of the superimposing. For example, when the light source is red-tinged, a weighting value of the spectroscopic characterization $S_c$ to which the red color reference light is relating is set to be large. It is possible to surely enhance an estimation accuracy of the spectroscopic characterization of the incident light independent from the type of the light source.

Figure 15:
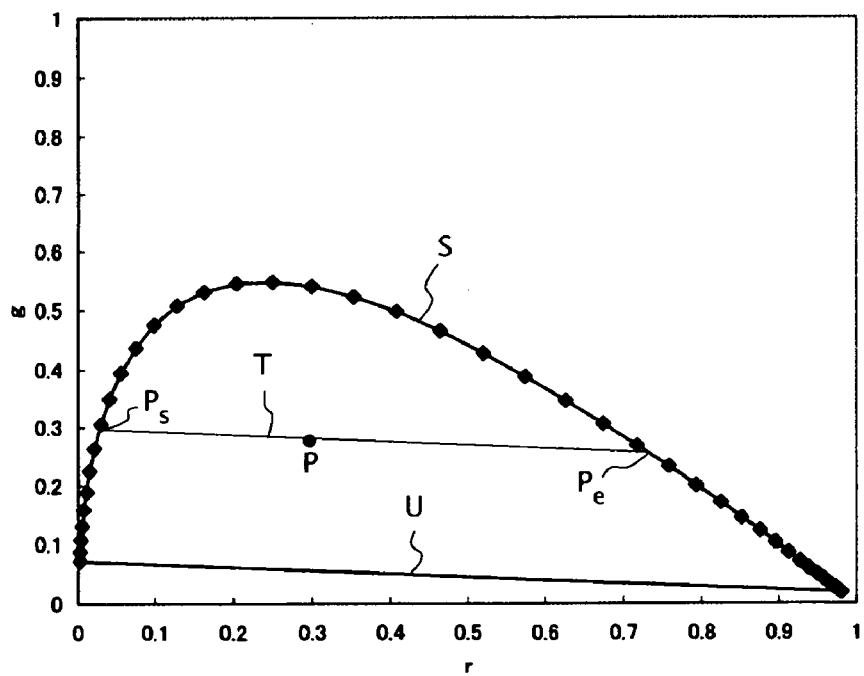
FIG. 15 is a view describing a modification example of step S4 to the step S9.

Besides, the computer 21 of the above-stated embodiment asks light segments with various angles passing on the point to be converted P in the step S4 to the step S9, but one line segment $P_s P_e$ passing on the point to be converted P and in parallel with the red-violet light U may be asked instead of these line segments as shown in FIG. 15. In this case, the computer 21 detects two to four reference points positioning in a vicinity of the start point PS and the end point $P_e$, and regards the weighting synthesis of the spectroscopic characterizations of two to four reference lights corresponding to the two to four reference points as the spectroscopic characterization of the incident light.

Figure 16:
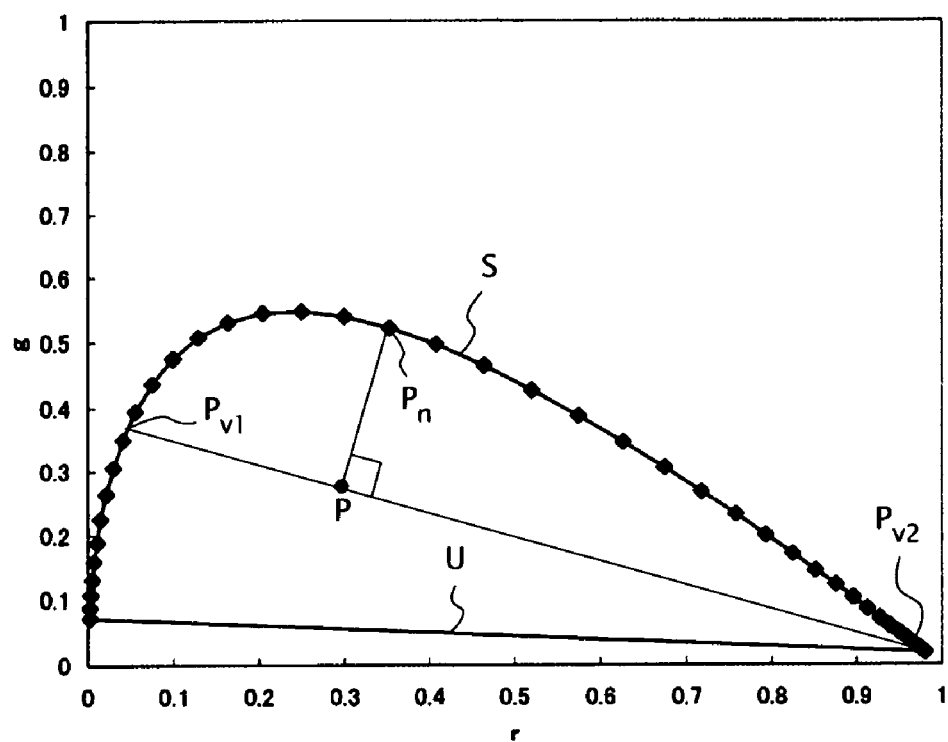
FIG. 16 is a view describing another modification example of the step S4 to the step S9.

Besides, the computer 21 of the above-stated embodiment asks the light segments with various angles passing on the point to be converted P in the step S4 to the step S9, but a first line segment $PP_n$ heading for the reference point nearest from the point to be converted P and a second line segment $P_{V1}P_{V2}$ passing on the point to the be converted P and perpendicular to the line segment $PP_n$ may be asked as shown in FIG. 16 instead of these line segments. In this case, the computer 21 detects three to five reference points positioning in a vicinity of the points $P_{V1}, P_{V2}, P_n$, and regards the weighting synthesis of the spectroscopic characterizations of three to five reference lights corresponding to the three to five reference points as the spectroscopic characterization of the incident light.

Figure 17:
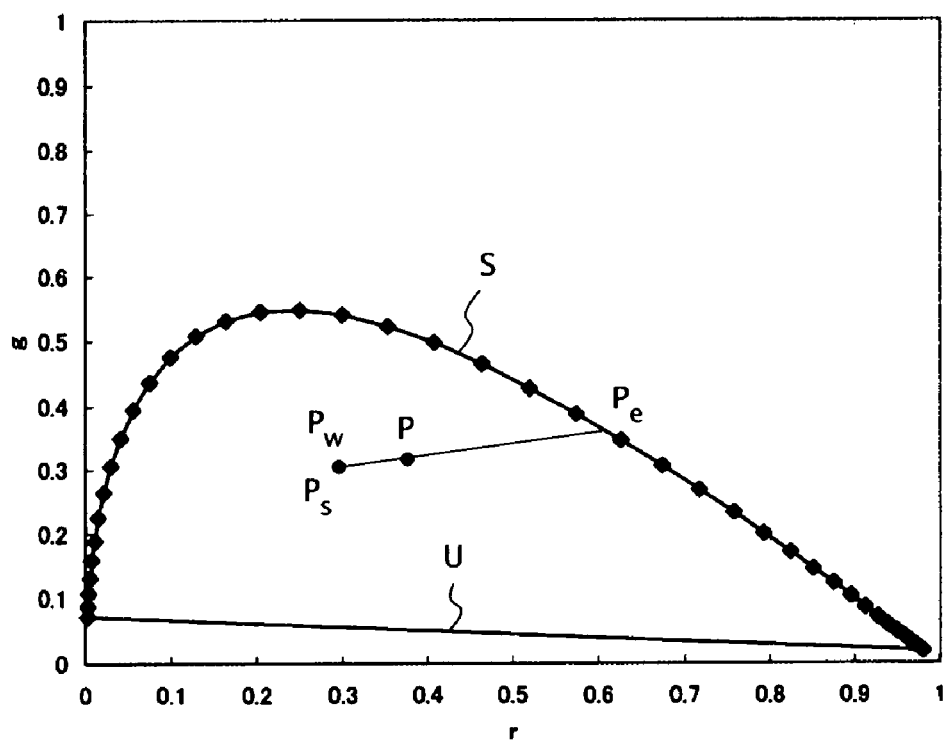
FIG. 17 is a view describing a characteristic data and a modification example of the step S4 to the step S9.

Besides, the computer 21 of the above-stated embodiment assumes the plurality of monochromatic lights as the plurality of reference lights (refer to FIG. 2), but a combination of white light and the plurality of monochromatic lights may be assumed. In this case, the manufacturer adds a reference point (a white point) $P_w$ corresponding to the white light to the characteristic data of the color imaging device, as shown in FIG. 17. Incidentally, the white point $P_w$ positions in a vicinity of a center of the closed curve S.

In the step S4 to the step S9 in this case, the computer 21 asks a line segment $P_w P_e$ starts from the white point $P_w$, passing through the point to be converted P, and intersects the closed curve S, detects two to three reference points (one of them is the white point) positioning in a vicinity of the points $P_w$, $P_e$, and regards the weighting synthesis of the spectroscopic characterizations of two to three reference lights (one of them is the white point) corresponding to the two to three reference points as the spectroscopic characterization of the incident light.

Figure 18:
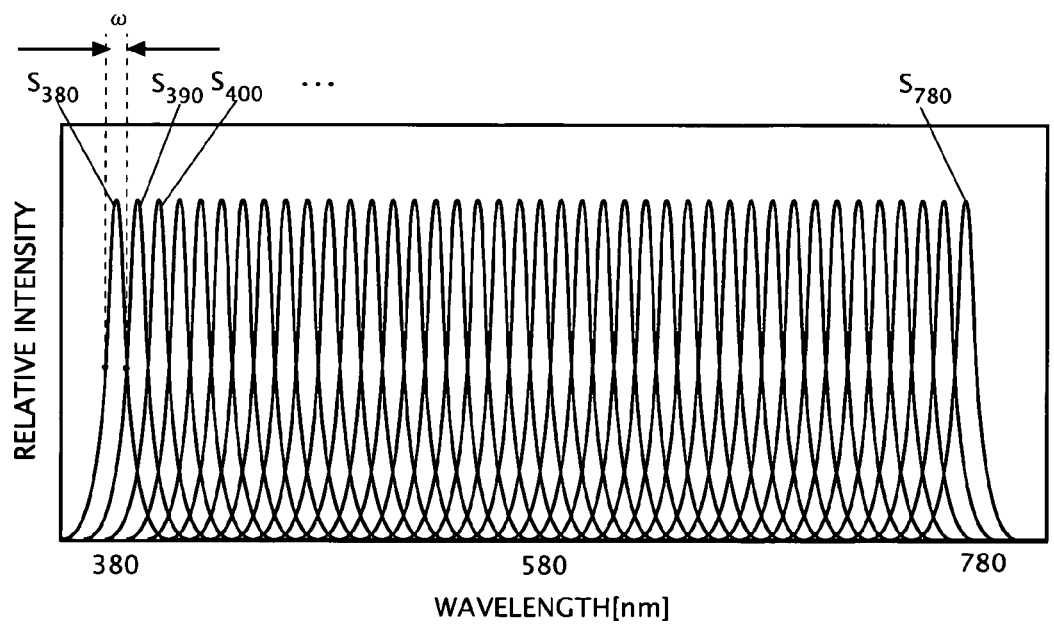
FIG. 18 is a view describing a characteristic data and another modification example of the step S4 to the step S9.
Figure 19:
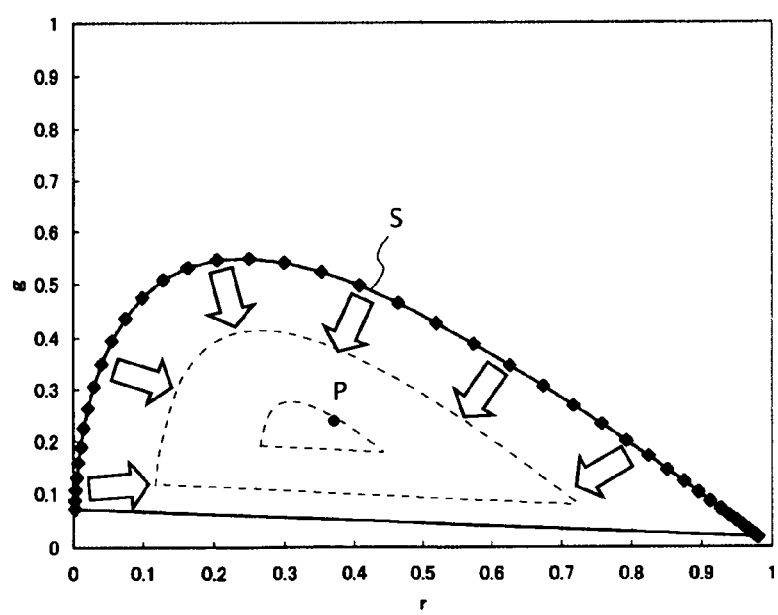
FIG. 19 is a view describing a characteristic data and still another modification example of the step S4 to the step S9.

Besides, the computer 21 of the above-stated embodiment records a relation between the plurality of reference lights of which spectroscopic characterizations are already known (refer to FIG. 2) and the reference points $P_{380}$, $P_{390}$, ..., $P_{780}$ (refer to FIG. 8) in advance, but further, the computer 21 may record a relation between a change of half breadths $\omega$ of the plurality of reference lights (refer to FIG. 18) and a movement of the plurality of reference points $P_{380}$, $P_{390}$, ..., $P_{780}$ (refer to FIG. 19). As shown by arrow heads in FIG. 18 and FIG. 19, the larger the half breadth $\omega$ becomes, the narrower a distribution range of the reference points $P_{380}$, $P_{390}$, ..., $P_{780}$ becomes, and a size of the closed curve S becomes small.

In the step S4 to the step S9 in the above case, the computer 21 detects a value $\omega_0$ of the half breadth $\omega$ when the closed curve S passes on the point to be converted P while changing the half breadth $\omega$ and the size of the closed curve S working with the half breadth $\omega$. The computer 21 detects one or two reference point(s) positioning in a vicinity of the point to be converted P under the state as stated above, and regards the weighting synthesis of the spectroscopic characterization of one or two reference light(s) corresponding to the one or two reference point(s) (however, the value of the half breadth $\omega$ is $\omega_0$) as the spectroscopic characterization of the incident light.

Figures 20, 21:
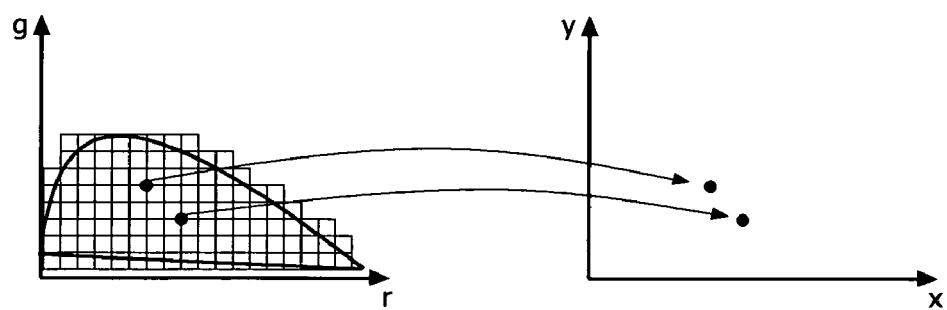
FIG. 20 is a view describing a lookup table.
FIG. 21 is a view describing a correspondence table between an RAW data and a device independent color.

Besides, the computer 21 of the present embodiment performs the chromatic coordinate conversion by the calculation, but a lookup table in which each rg value on the rg chromaticity coordinate system and each xy value on the xy chromaticity coordinate system are corresponded with each other may be used as shown in FIG. 20. A lookup table capable of performing a high accurate coordinate transformation can be obtained if the above-stated any one of the chromatic coordinate conversion methods is adopted to create the lookup table.

In this case, the computer 21 may generate information of each point on the rg chromaticity coordinate system from the information stored in the lookup table by an interpolation calculation if necessary.

Besides, when the RAW data after the chromatic coordinate conversion (Yxy data) is outputted to the monitor 22a, the computer 21 of the above-stated embodiment may convert the Yxy data into the RGB data complying with the characteristic of the monitor 22a. As a result, an accurate color-reproduction becomes possible regardless of what kind of characteristics the color imaging device and the monitor 22a have.

Besides, when the computer 21 of the above-stated embodiment outputs the Yxy data after the chromatic coordinate conversion to a not-shown printer, the computer 21 may convert the Yxy data into a CMYK data complying with a characteristic of the printer. Accordingly, the accurate color-reproduction becomes possible regardless of what kind of characteristics the color imaging device and the printer have.

Besides, any one of the above-stated chromatic coordinate conversion methods are also effective when a correspondence table between the RAW data generated by the color imaging device and device independent colors (refer to FIG. 21) is created. This can be realized by a software program, a work sheet, and so on.

Besides, in the above-stated embodiment, the function of the chromatic coordinate conversion is mounted on the computer 21, but the similar function of the chromatic coordinate conversion may be mounted on other apparatuses such as an electronic camera, a printer with monitor, and a television monitor.

Besides, when an automatic white balance control function (namely, a function referring to a rg chromaticity of each small area of a photographed image, and performing a light source judgment based on the rg chromaticity) is mounted on the electronic camera, the light source judgment is good to be performed after the rg chromaticity of the small area is performed the chromatic coordinate conversion. As a result, it becomes possible to perform the light source judgment not on the chromatic coordinate system unique to the color imaging device, but on the predetermined chromaticity coordinate system.

Besides, a human skin discrimination is preferable to be performed after the chromatic coordinate conversion of the chromaticity of the small area is performed, when a function performing the human skin discrimination is mounted on the electronic camera. As a result, it becomes possible to perform the human skin discrimination not on the chromaticity coordinate system unique to the color imaging device, but on the predetermined chromaticity coordinate system (a general chromaticity coordinate system reflecting human visual characteristics such as the chromaticity coordinate system of the CIE colorimetric system).

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A chromatic coordinate converting apparatus, comprising:
   a storing unit storing information representing a plurality of chromaticity values of reference lights in a chromaticity coordinate system unique to a color sensor in advance; and
   a converting unit performing a chromatic coordinate conversion of a first chromaticity value being a chromaticity value generated by said color sensor into a second chromaticity value of a predetermined chromaticity coordinate system based on the information stored by said storing unit, wherein
   said converting unit comprises computing weighting ratios for a weighting synthesis of reference lights so that a chromaticity of said weighting synthesis of reference lights is equal to said first chromaticity value, and
   said converting unit obtains said second chromaticity value by estimating a spectroscopic characterization of incident light for said color sensor based on said information and said first chromaticity value, and thereafter, by representing the spectroscopic characterization by said predetermined chromaticity coordinate system.

2. The chromatic coordinate converting apparatus according to claim 1, further comprising
a spectroscopic storing unit storing spectroscopic information representing a plurality of spectroscopic characterization of said reference lights; wherein
said converting unit obtains said second chromaticity value by estimating a spectroscopic characterization of incident light for said color sensor using said spectroscopic information.

3. The chromatic coordinate converting apparatus according to claim 1, further comprising
a second storing unit storing second information representing the plurality of chromaticity values of reference lights in said predetermined chromaticity coordinate system; wherein
said converting unit obtains said second chromaticity value by using said second information.

4. The chromatic coordinate converting apparatus according to claim 3, wherein
said plurality of reference lights are composed of a plurality of monochromatic lights different from one another within a visual light range.

5. The chromatic coordinate converting apparatus according to claim 3, wherein
said plurality of reference lights are composed of a plurality of monochromatic lights different from one another within a visual light range and white light.

6. The chromatic coordinate converting apparatus according to claim 4, wherein
said converting unit:
estimates a part of said spectroscopic characterization of the incident light by assuming a closed curve connecting said plurality of reference chromaticity values in said unique chromaticity coordinate system, and one straight line passing on said first chromaticity value, and by performing the weighting synthesis of the spectroscopic characterizations of the reference lights having colors corresponding to intersection points of said closed curve and said straight line among said plurality of reference lights; and
estimates a whole of said spectroscopic characterization of the incident light by repeating said estimation while changing said straight line to obtain a plurality of estimated results, and by superimposing the above-stated estimated results.

7. The chromatic coordinate converting apparatus according to claim 6, wherein
said converting unit takes off the estimated result from an object of said superimposing when said straight line is a straight line intersecting a red-violet light of said closed curve.

8. The chromatic coordinate converting apparatus according to claim 6, wherein
said superimposing is a weighting superimposing, and
said converting unit sets the weighting ratio of said weighting superimposing in accordance with a spectroscopic characterization of a light source illuminating an object of detection of said color sensor.

9. An imaging apparatus, comprising:
a color imaging device; and
a chromatic coordinate converting apparatus according to claim 1 performing a chromatic coordinate conversion of a chromaticity value generated by said color imaging device.

10. A non-transitory computer readable recording medium for causing a computer to execute a chromatic coordinate converting program, comprising:
a storing operation storing information representing a plurality of chromaticity values of reference lights in a chromaticity coordinate system unique to a color sensor in advance; and
a converting operation performing a chromatic coordinate conversion of a first chromaticity value being a chromaticity value generated by said color sensor into a second chromaticity value of a predetermined chromaticity coordinate system based on the information stored in said storing operation, wherein
said converting operation comprises computing weighting ratios for a weighting synthesis of reference lights so that a chromaticity of said weighting synthesis of reference lights is equal to said first chromaticity value, and
said second chromaticity value is obtained by estimating a spectroscopic characterization of incident light for said color sensor based on said information and said first chromaticity value, and thereafter, by representing the spectroscopic characterization by said predetermined chromaticity coordinate system, in said converting operation.

11. The non-transitory computer readable recording medium according to claim 10, further comprising
storing spectroscopic information representing a plurality of spectroscopic characterization of said reference lights; wherein
said second chromaticity value is obtained by estimating a spectroscopic characterization of incident light for said color sensor using said spectroscopic information.

12. The non-transitory computer readable recording medium according to claim 10, further comprising
storing second information representing the plurality of chromaticity values of reference lights in said predetermined chromaticity coordinate system; wherein
obtaining said second chromaticity value by using said second information, in said converting operation.

13. The non-transitory computer readable recording medium according to claim 12, wherein
said plurality of reference lights are composed of a plurality of monochromatic lights different from one another within a visual light range.

14. The non-transitory computer readable recording medium according to claim 12, wherein
said plurality of reference lights are composed of a plurality of monochromatic lights different from one another within a visual light range and white light.

15. The non-transitory computer readable recording medium according to claim 13, wherein
a part of said spectroscopic characterization of the incident light is estimated by assuming a closed curve connecting said plurality of reference chromaticity values in said unique chromaticity coordinate system and one straight line passing on said first chromaticity value, and by performing a weighting synthesis of spectroscopic characterizations of reference lights having colors corresponding to intersection points of said closed curb and said straight line among said plurality of reference lights, and
a whole of said spectroscopic characterization of the incident light is estimated by repeating said estimation while changing said straight line to obtain a plurality of estimated results and by superimposing the above-stated estimated results, in said converting operation.

16. The non-transitory computer readable recording medium according to claim 15, wherein
the estimated result when said straight line is a straight line intersecting a red-violet light of said closed curve is taken off from an object of said superimposing, in said converting operation.

17. The non-transitory computer readable recording medium according to claim 15, wherein
said superimposing is a weighting superimposing, and
the weighting ratio of said weighting superimposing is set in accordance with a spectroscopic characterization of a light source illuminating an object of detection of said color sensor, in said converting operation.

18. The chromatic coordinate converting apparatus according to claim 1, wherein
said storing unit stores information of a plurality of reference chromaticity values generated by said color sensor in accordance with each of a plurality of reference lights of which spectroscopic characterizations are already known, and
said converting unit estimates said spectroscopic characterization of the incident light by performing a weighting synthesis of said spectroscopic characterizations of the plurality of reference lights with a weighting ratio in accordance with a relation between said plurality of reference chromaticity values and said first chromaticity value.

19. The chromatic coordinate converting apparatus according to claim 10, wherein
a plurality of reference chromaticity values generated by said color sensor in accordance with each of a plurality of reference lights of which spectroscopic characterizations are already known are stored, in the stored operation, and
said spectroscopic characterization of the incident light is estimated by performing a weighting synthesis of said spectroscopic characterizations of the plurality of reference lights with a weighting ratio in accordance with a relation between said plurality of reference chromaticity values and said first chromaticity value, in said converting operation.

\* \* \* \* \*